US011725522B2

(12) United States Patent
Banhos et al.

(10) Patent No.: US 11,725,522 B2
(45) Date of Patent: Aug. 15, 2023

(54) AIRFOIL WITH WISHBONE FIBER STRUCTURE

(71) Applicant: RAYTHEON TECHNOLOGIES CORPORATION, Farmington, CT (US)

(72) Inventors: Jonas S. Banhos, Rocky Hill, CT (US); Kathryn S. Read, Marlborough, CT (US); Raymond Surace, Newington, CT (US); Olivier H. Sudre, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 55 days.

(21) Appl. No.: 17/149,944

(22) Filed: Jan. 15, 2021

(65) Prior Publication Data
US 2022/0228496 A1 Jul. 21, 2022

(51) Int. Cl.
*F01D 5/28* (2006.01)
*F01D 5/14* (2006.01)
*F01D 5/18* (2006.01)

(52) U.S. Cl.
CPC ............. *F01D 5/282* (2013.01); *F01D 5/147* (2013.01); *F01D 5/18* (2013.01); *F05D 2200/11* (2013.01);
(Continued)

(58) Field of Classification Search
CPC ..... F05D 2300/6034; F05D 2300/6033; F05D 2250/75; F05D 2240/304; F05D 2240/301; F01D 5/18; F01D 5/147; F01D 5/282
See application file for complete search history.

(56) References Cited

U.S. PATENT DOCUMENTS 7,066,717 B2   6/2006  Morrison et al.
7,575,417 B2   8/2009  Finn et al.
(Continued)

FOREIGN PATENT DOCUMENTS

EP    3415717      12/2018
EP    3587736       1/2020
WO    2014186011   11/2014

OTHER PUBLICATIONS

Calomino, A. and Verrilli, M. (2004). Ceramic matrix composite vane subelement fabrication. Proceedings of ASME Turbo Expo 2004. Jun. 14-17, 2004. pp. 1-7.
(Continued)

*Primary Examiner* — Courtney D Heinle
*Assistant Examiner* — Andrew Thanh Bui
(74) *Attorney, Agent, or Firm* — Carlson, Gaskey & Olds, P.C.

(57) ABSTRACT

An airfoil includes an airfoil wall that defines a leading end, a trailing end, and pressure and suction sides that join the leading end and the trailing end. The airfoil wall includes a wishbone-shaped fiber layer structure that has a pair of arms that merge into a single leg. The pair of arms are formed by first and second S-shaped fiber layers each of which is comprised of a network of fiber tows. The first and second S-shaped fiber layers merge to form the single leg. The single leg comprises fiber tows from each of the first and second S-shaped fiber layers that are interwoven, and the single leg forms at least a portion of the trailing end of the airfoil wall.

14 Claims, 8 Drawing Sheets

(52) U.S. Cl.
CPC .. *F05D 2240/301* (2013.01); *F05D 2240/304* (2013.01); *F05D 2250/75* (2013.01); *F05D 2300/6033* (2013.01); *F05D 2300/6034* (2013.01)

(56) References Cited

U.S. PATENT DOCUMENTS

| | | | |
|---|---|---|---|
| 7,600,979 | B2 | 10/2009 | Steibel et al. |
| 9,664,053 | B2 * | 5/2017 | Marshall ............. D03D 25/005 |
| 9,957,821 | B2 * | 5/2018 | Duelm ...................... F01D 5/28 |
| 10,569,481 | B2 | 2/2020 | Gallier et al. |
| 2020/0232332 | A1 * | 7/2020 | Farrar ...................... F01D 5/14 |
| 2021/0140325 | A1 * | 5/2021 | Kennedy ................. F01D 5/282 |
| 2021/0189889 | A1 * | 6/2021 | Decesare ................ F01D 5/187 |

OTHER PUBLICATIONS

European Search Report for European Patent Application No. 22151879.8 dated Jun. 22, 2022.

\* cited by examiner

AIRFOIL WITH WISHBONE FIBER STRUCTURE

BACKGROUND

A gas turbine engine typically includes a fan section, a compressor section, a combustor section and a turbine section. Air entering the compressor section is compressed and delivered into the combustion section where it is mixed with fuel and ignited to generate a high pressure and temperature gas flow. The high pressure and temperature gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil wall that defines a leading end, a trailing end, and pressure and suction sides that join the leading end and the trailing end. The airfoil wall has a wishbone-shaped fiber layer structure. The wishbone-shaped fiber layer structure includes a pair of arms that merge into a single leg. The pair of arms are formed by first and second S-shaped fiber layers each of which is comprised of a network of fiber tows. The first and second S-shaped fiber layers merge to form the single leg. The single leg includes fiber tows from each of the first and second S-shaped fiber layers that are interwoven. The single leg forms at least a portion of the trailing end of the airfoil wall.

In a further embodiment of any of the foregoing embodiments, the wishbone-shaped fiber layer structure is situated between an exterior pressure side face skin fiber layer and an exterior suction side face skin fiber layer.

In a further embodiment of any of the foregoing embodiments, there is filler material between the single leg of the wishbone-shaped fiber layer structure and the exterior pressure side face skin fiber layer and between the single leg and the exterior suction side face skin fiber layer.

In a further embodiment of any of the foregoing embodiments, the filler material, the exterior pressure side face skin fiber layer, and the exterior suction side face skin fiber layer are of equivalent compositions.

In a further embodiment of any of the foregoing embodiments, the first and second S-shaped fiber layers are also of the equivalent composition.

In a further embodiment of any of the foregoing embodiments, the filler fiber material is selected from a monolithic ceramic, a 3-D woven fabric, fully or partially densified fiber material, or combinations thereof.

In a further embodiment of any of the foregoing embodiments, the pair of arms define an airfoil cavity there between.

In a further embodiment of any of the foregoing embodiments, the first and second S-shaped fiber layers are ceramic matrix composite.

In a further embodiment of any of the foregoing embodiments, the first and second S-shaped fiber layers define, respectively, thicknesses t1 and t2, the single leg defines a thickness t3, and t3 is less than or equal to the sum of t1 and t2.

In a further embodiment of any of the foregoing embodiments, each of the first and second S-shaped fiber layers defines two inflection points and a region between the two inflection points over which the respective first or second S-shaped fiber layer is straight.

An airfoil according to an example of the present disclosure includes an airfoil wall defining a leading end, a trailing end, and pressure and suction sides that join the leading end and the trailing end. The airfoil wall has a series of wishbone-shaped fiber layer structures that are nested together and form at least a portion of the trailing end of the airfoil wall. Each of the wishbone-shaped fiber layer structures has a pair of arms that merge into a single leg. The pair of arms are formed by first and second fiber layers that are each comprised of a network of fiber tows. The first and second fiber layers merging to form the single leg. The single leg includes fiber tows from each of the first and second fiber layers that are interwoven.

In a further embodiment of any of the foregoing embodiments, the series includes at least three of the wishbone-shaped fiber layer structures.

In a further embodiment of any of the foregoing embodiments, the first and second fiber layers are S-shaped.

In a further embodiment of any of the foregoing embodiments, the airfoil wall includes one or more filler fiber plies between consecutive ones of the wishbone-shaped fiber layer structures.

In a further embodiment of any of the foregoing embodiments, the series of wishbone-shaped fiber layer structures are situated between an exterior pressure side face skin fiber layer and an exterior suction side face skin fiber layer.

In a further embodiment of any of the foregoing embodiments, the one or more filler fiber plies, the exterior pressure side face skin fiber layer, the exterior suction side face skin fiber layer, and the first and second fiber layers are of equivalent compositions.

In a further embodiment of any of the foregoing embodiments, the first and second fiber layers define, respectively, thicknesses t1 and t2, the single leg defines a thickness t3, and t3 is less than or equal to the sum of t1 and t2.

A gas turbine engine according to an example of the present disclosure includes a compressor section, a combustor in fluid communication with the compressor section, and a turbine section in fluid communication with the combustor. The turbine section has airfoils disposed about a central axis of the gas turbine engine. Each of the airfoils has an airfoil wall defining a leading end, a trailing end, and pressure and suction sides that join the leading end and the trailing end. The airfoil wall has a wishbone-shaped fiber layer structure. The wishbone-shaped fiber layer structure has a pair of arms that merge into a single leg. The pair of arms are formed by first and second S-shaped fiber layers each of which is comprised of a network of fiber tows. The first and second S-shaped fiber layers merging to form the single leg. The single leg includes fiber tows from each of the first and second S-shaped fiber layers that are interwoven. The single leg forms at least a portion of the trailing end of the airfoil wall.

In a further embodiment of any of the foregoing embodiments, the wishbone-shaped fiber layer structure is situated between an exterior pressure side face skin fiber layer and an exterior suction side face skin fiber layer, there is filler fiber material between the single leg of the wishbone-shaped fiber layer structure and the exterior pressure side face skin fiber layer and between the single leg and the exterior suction side face skin fiber layer, and the pair of arms define an airfoil cavity there between.

In a further embodiment of any of the foregoing embodiments, the filler fiber material, the exterior pressure side face skin fiber layer, the exterior suction side face skin fiber layer, the first and second S-shaped fiber layers are of the equivalent ceramic matrix composite compositions, the first and second S-shaped fiber layers define, respectively, thicknesses t1 and t2, the single leg defines a thickness t3, and t3 is less than or equal to the sum of t1 and t2.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
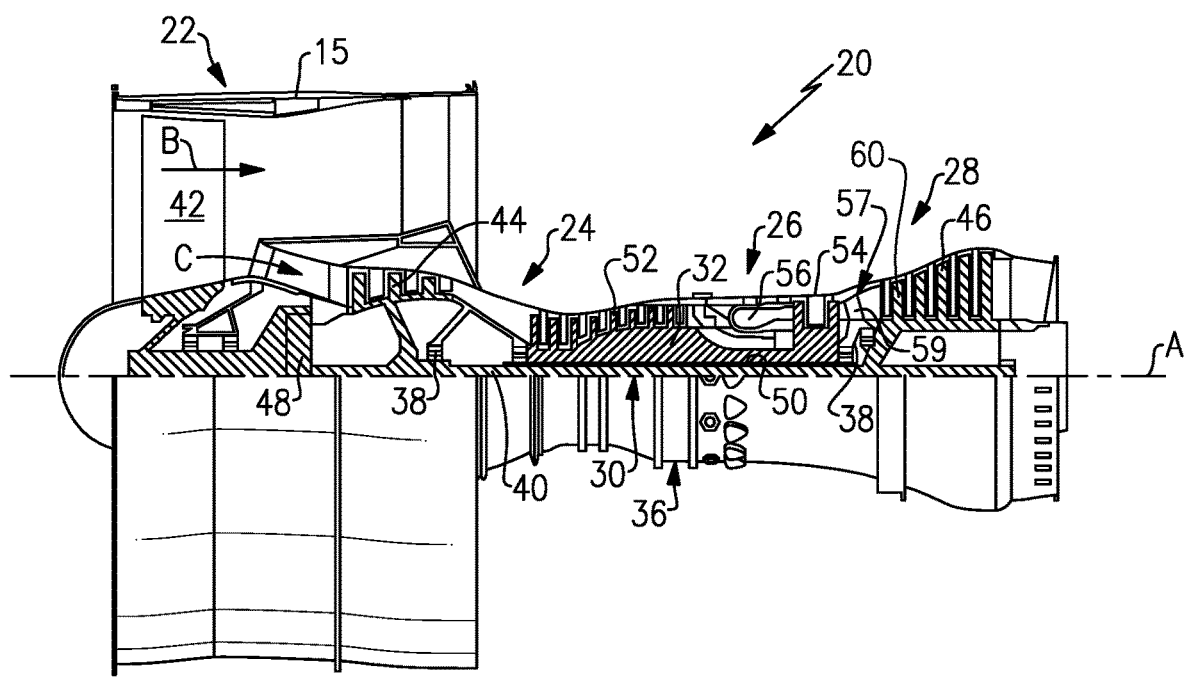
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{R})/(518.7° \text{R})]^{0.5}$. The "Low corrected fan tip speed" as disclosed herein according to one non-limiting embodiment is less than about 1150 ft/second (350.5 meters/second).

Figure 2:
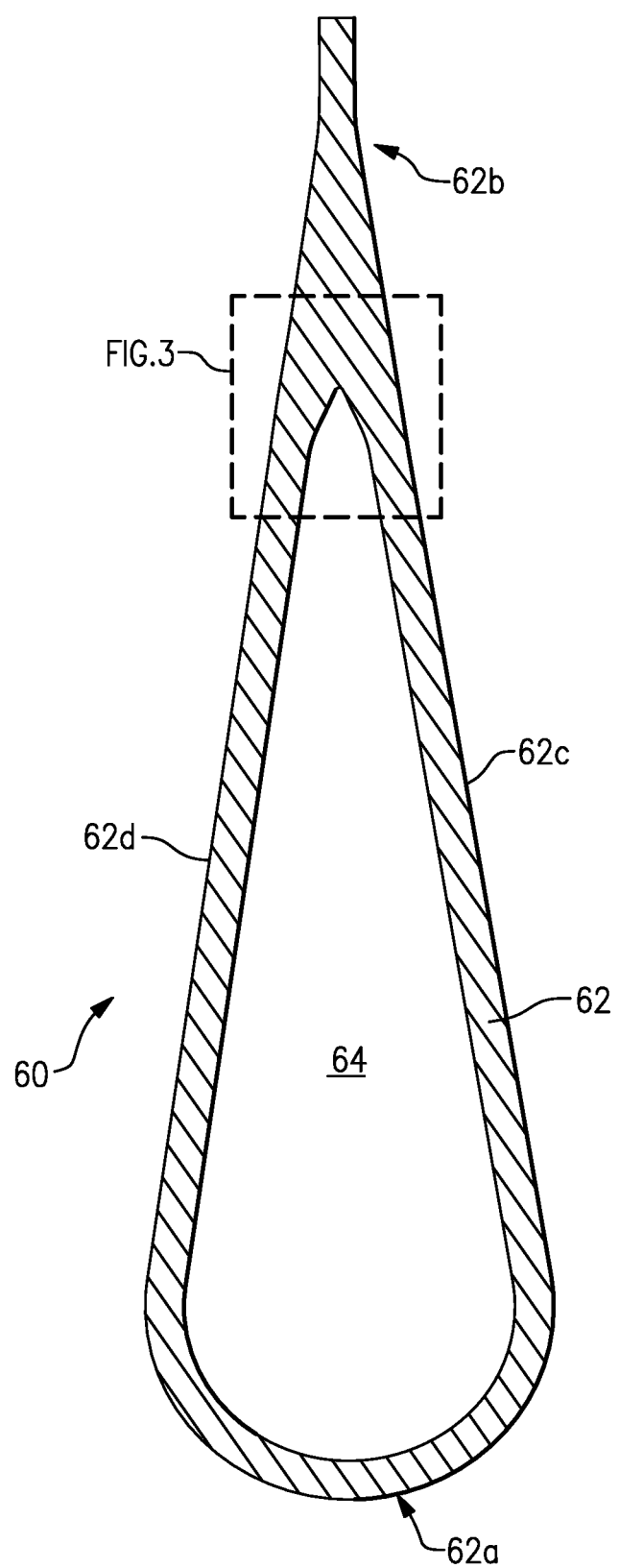
FIG. 2 illustrates a sectioned view of an airfoil of the engine.

FIG. 2 illustrates a sectioned view of an example airfoil 60 from the turbine section 28 of the engine 20 (see also FIG. 1). For example, the airfoil 60 may be a blade or a vane. It is to be understood that although the examples herein are discussed in context of a turbine airfoil, the examples can be applied to airfoils in other sections of the engine 20.

The aerodynamic profile of the airfoil 60 is formed by an airfoil wall 62. In this regard, the airfoil wall 62 defines a leading end 62a, a trailing end 62b, a pressure side 62c, and a suction side 62d of the airfoil 60. The airfoil wall 62 circumscribes an interior cavity 64, to which cooling air (e.g., from the compressor section 24) may be provided.

The airfoil wall 62 is formed of a ceramic matrix composite (CMC), an organic matrix composite (OMC), or a metal matrix composite (MMC). For instance, a CMC is formed of ceramic fibers that are disposed in a ceramic matrix. The CMC may be, but is not limited to, a SiC/SiC ceramic matrix composite in which SiC fibers are disposed within a SiC matrix. Example organic matrix composites include, but are not limited to, glass fiber, carbon fiber, and/or aramid fibers disposed in a polymer matrix, such as epoxy. Example metal matrix composites include, but are not limited to, boron carbide fibers and/or alumina fibers disposed in a metal matrix, such as aluminum.

Due to bending, thermal gradients, and pressure loading, a composite material in a trailing end of an airfoil is subjected stresses. Stresses on a composite material that is formed of fiber plies can cause the plies to delaminate from each other along the interfaces of the plies. Additionally, many composites use non-structural filler materials in regions between plies or groups of plies. Such fillers have different properties than the adjacent composite layup, which can exacerbate stresses on adjacent plies. As will be described below, the airfoil 60 includes features to facilitate reduction in stresses and, therefore, enhance durability.

Figure 3:
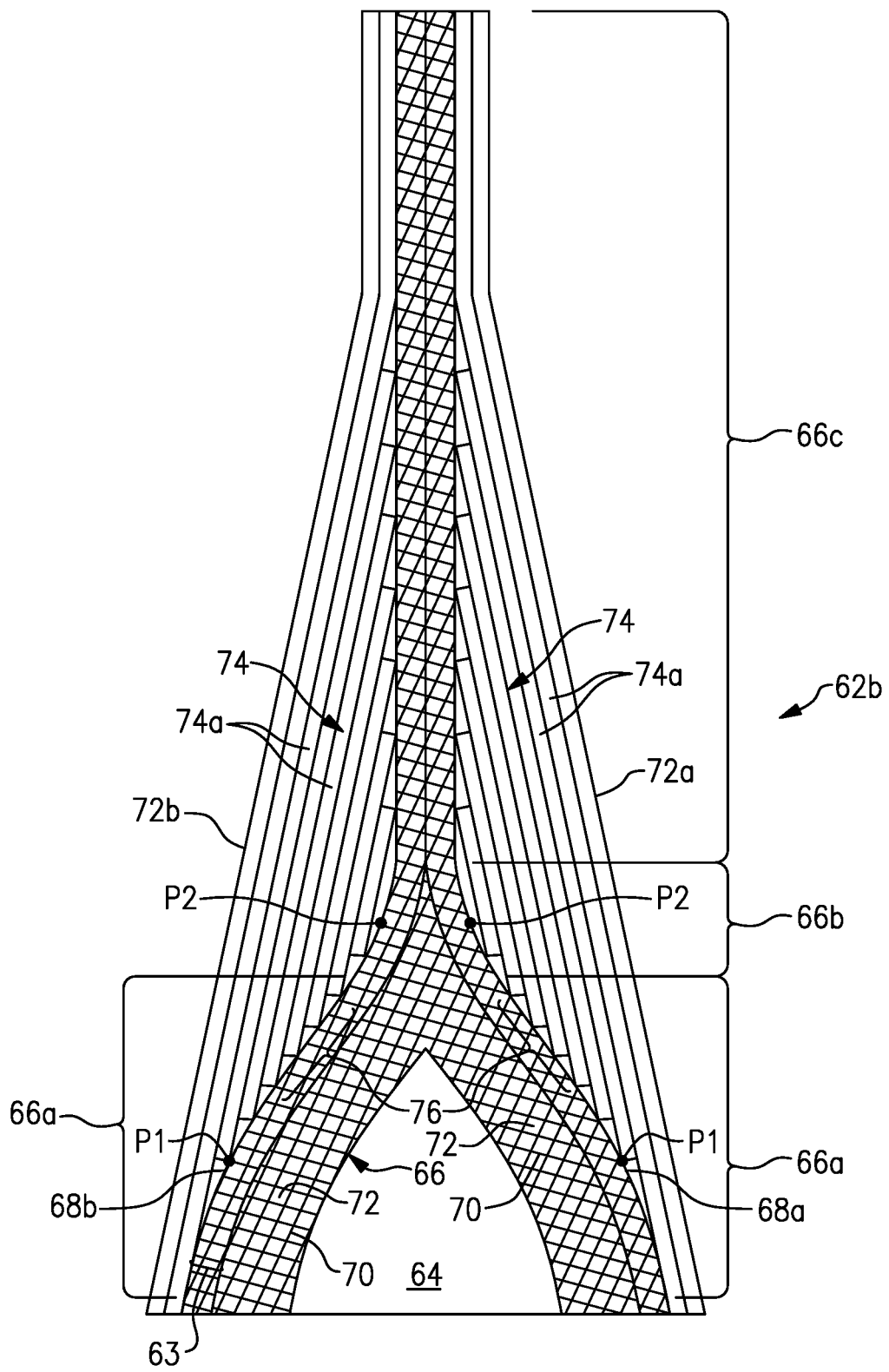
FIG. 3 illustrates the trailing end of the airfoil of FIG. 2.
Figure 4:
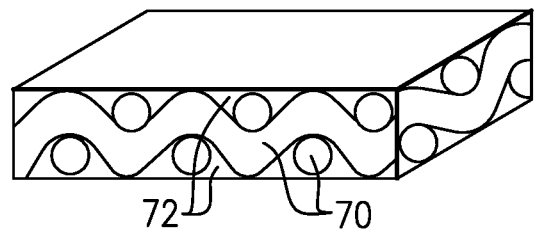
FIG. 4 illustrates a representative view of a fiber layer.

One such feature is a wishbone-shaped fiber layer structure. FIG. 3 illustrates a view of the trailing end of the airfoil 60 in which the airfoil 60 includes a wishbone-shaped fiber layer structure 66 (hereafter "structure 66"). The term "wishbone-shaped" refers to the resemblance of the structure 66 to a wishbone that has a leg and two arms that extend from an end of the leg to form a "V." Here, the structure 66 includes a pair of arms 66a that merge in a transition region 66b into a single leg 66c. In this example, the arms 66a are formed by first and second S-shaped fiber layers 68a/68b. Each of the fiber layers 68a/68b is comprised of a network (e.g., a weave) of fiber tows 70 that are disposed in a matrix material 72 (both represented schematically). As an example, a representative portion of the fiber layers 68a/68b is depicted in FIG. 4. It is to be understood that although the network of fiber tows 70 is shown with a particular weave pattern, that other weave patterns may be used. Referring again to FIG. 3, the fiber layers 68a/68b merge in the transition region 66b to form the single leg 66c. The single leg 66c forms at least a portion of the trailing end 62b of the airfoil wall 62. As shown, the fiber layers 68a/68b may optionally include one or more additional layers 63

Figure 5A:
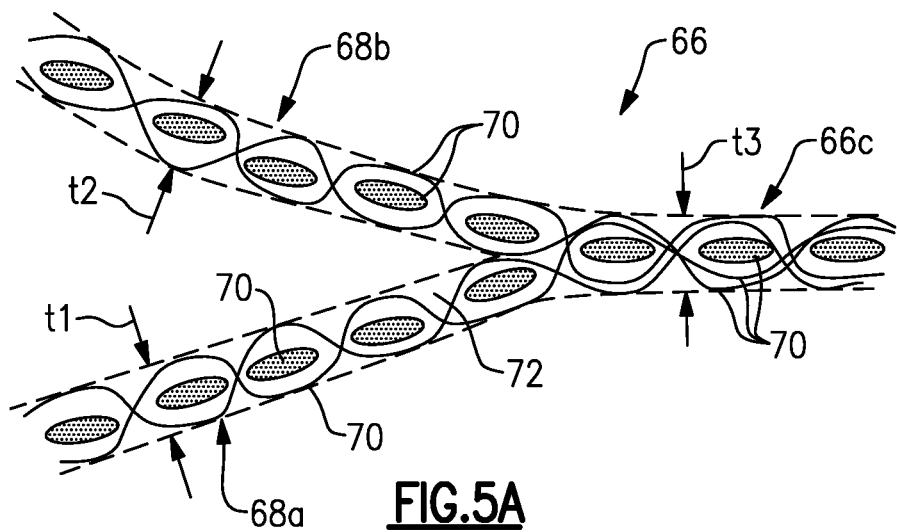
FIG. 5A illustrates a wishbone-shaped fiber structure.

FIG. 5A shows a representative view of a portion of the structure 66. The woven fiber tows 70 of the fiber layers 68a/68b merge together such that the fiber tows 70 from each of the first and second fiber layers 68a/68b are interwoven in the single leg 66c. Thus, once merged, the fiber layers 68a/68b cease to be distinct from each other and there are no interlaminar interfaces. In one further example that represents the merging, the fiber layers 68a/68b define, respectively, thicknesses t1 and t2, the single leg 66c defines a thickness t3, and t3 is less than or equal to the sum of t1 and t2. That is, the two layers combine to form a single layer of equal or lesser thickness than the two layers combined.

Figure 5B:
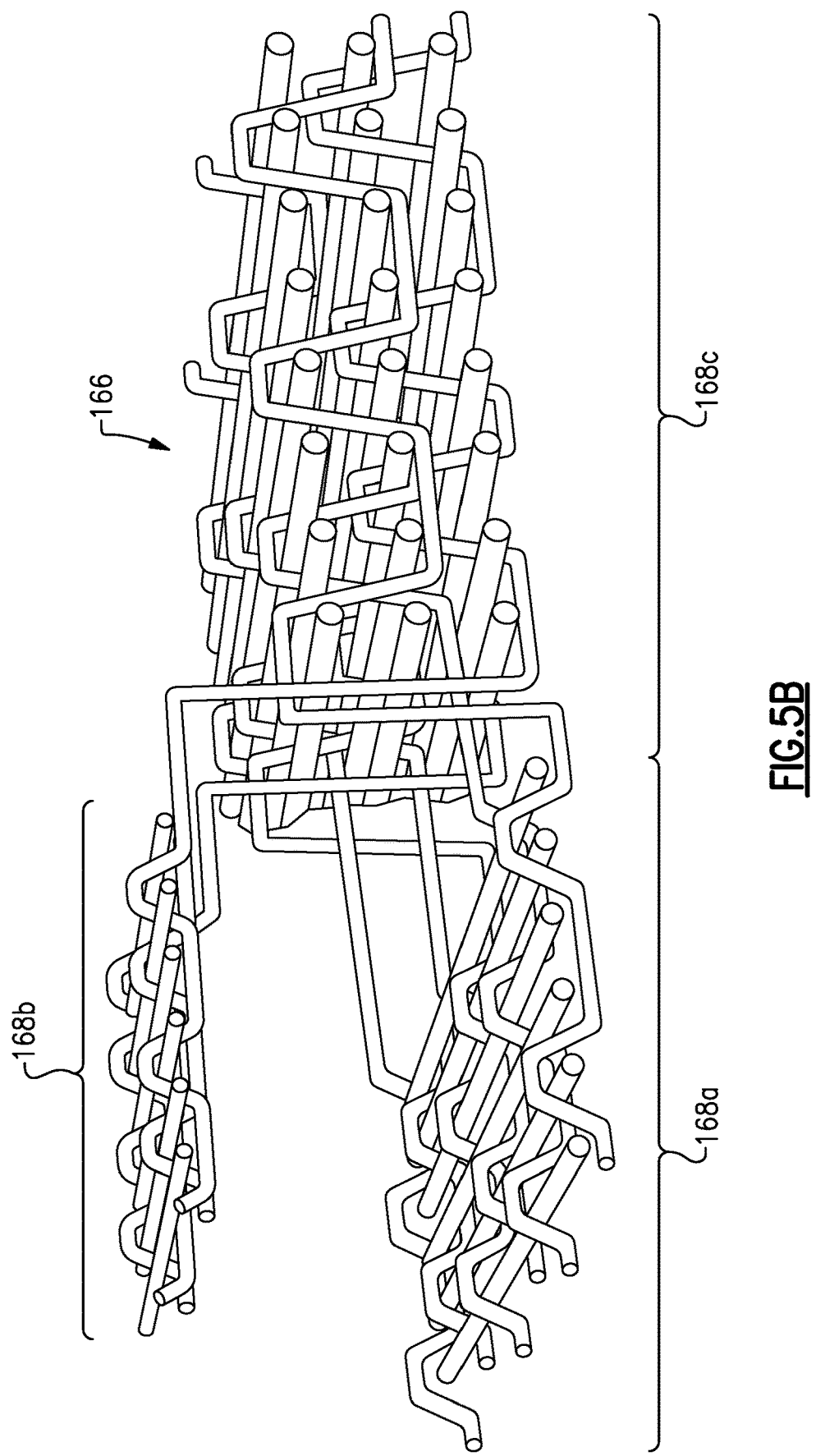
FIG. 5B illustrates another example wishbone-shaped fiber structure.

FIG. 5B shows another example wishbone-shaped fiber layer structure 166 that can alternatively be used. In the prior example the fiber layers 68a/68b are woven into 2D single leg 66c layer. In this example, however, the fiber layers 168a/168b are woven into a 3D single leg 166c. It is to be appreciated that the illustrated fiber architectures are non-limiting examples and that other fiber architectures may alternatively be used in the wishbone structure.

Referring again to FIG. 3, the first and second fiber layers 68a/68b are each S-shaped. An "S-shape" as used herein refers to the resemblance of the shape of the first and second fiber layers 68a/68b to the letter "S." In this regard, each of the first and second fiber layers 68a/68b includes two inflection points P1 and P2 at which the curvature of the respective fiber layers 68a/68b changes from concave to convex and vice versa. The inflection points P1 and P2 of the S-shape serve to provide two locations for the structure 66 to flex when under a bending moment. The allowance of the structure 66 to flex at these two locations distributes the stress rather than having it concentrated at one location, thereby reducing the peak stress at any single location. Further examples of the S-shaped geometry are discussed below.

In between the inflection points P1 and P2 the fiber layers 68a/68b may be entirely curved. However, in the illustrated example, the fiber layers 68a/68b each have a region 76 over which they are straight. The straight region 76 serves to enable lengthening or shortening the S-shape of the fiber layers 68a/68b. For instance, air pressure in the internal cavity 64 tends to spread the fiber layers 68a/68b apart, thereby subjecting the fiber layers 68a/68b to bending moments. For relatively higher pressures/stresses a longer straight region 76 may be used for high stress reduction, while for relatively lower pressures/stresses in the interior cavity 64 a shorter straight region 76 may be selected since the pressure/stress is lower. That is, the geometry of the S-shape can be easily tailored in the design stage to the expected stress and pressure conditions in the airfoil 60. Additionally, the distance between the transition region 66b and the inflection points P2 may be adjusted in the design stage to tailor the size of the interior cavity and the stresses in the trailing end 62b.

The airfoil wall 62 further includes an exterior pressure side face skin fiber layer 72a and an exterior suction side face skin fiber layer 72b. The structure 66 is situated between the face skin fiber layers 72a/72b. There is filler material 74 between the structure 66 and each of the face skin fiber layers 72a/72b. In this example, the filler material 74 includes one or more CMC fiber plies 74a that are stacked to a desired thickness to fill the space between the structure 66 and the face skin fiber layers 72a/72b. As shown, the fiber plies 74a are stacked such that the shortest plies are on the inside against the structure 66. Alternatively, however, the stack may be inverse, such that the longest plies are against the structure 66. The filler material 74 may be densified with the structure 66, partially pre-densified prior to densification of the structure 66, or fully densified prior to densification of the structure 66. In the illustrated example, the thickness of the filler fiber material 74 increases along the fiber layers 68a/68b (in a direction toward the tip of the trailing end 62b). The thickness is maximum along the transition region 66b and then decreases along the single leg 66c.

In one example, the filler material 74 and the face skin fiber layers 72a/72b are of equivalent compositions. For instance, the filler material 74 and the face skin fiber layers 72a/72b are composed of CMCs that nominally have the same composition fibers, the same composition matrix, and the same volume amounts of fibers and matrix. In one further example, the fiber layers 68a/68b are also of the same, equivalent composition as the filler fiber material 74 and the face skin fiber layers 72a/72b. This eliminates a difference in properties between different materials that can otherwise exacerbate stresses.

Figure 6:
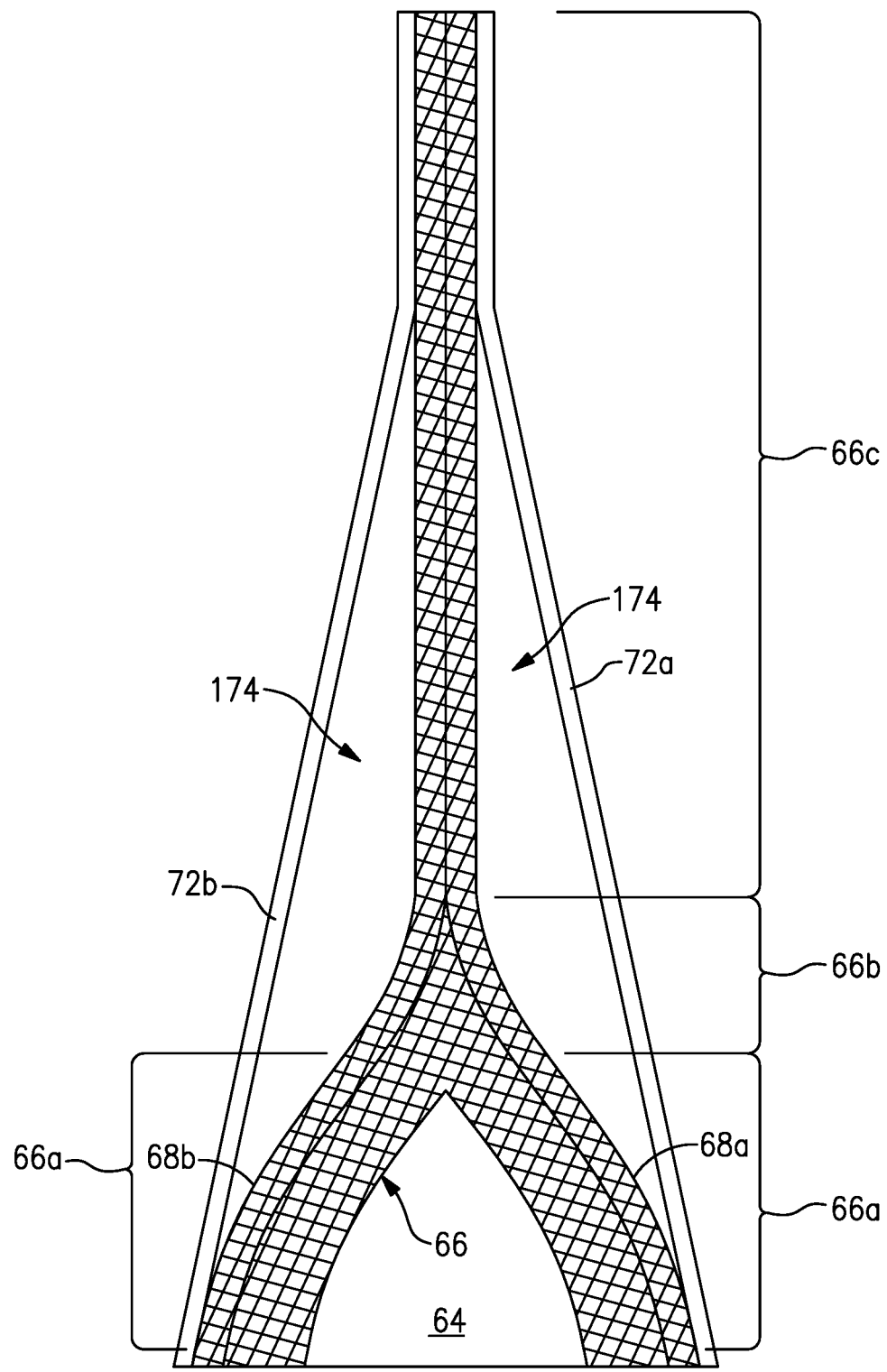
FIG. 6 illustrates another example airfoil in which a 3-D fiber filler is used.

FIG. 6 illustrates a modified example of the airfoil 60 that is the same as shown in FIG. 3 except that instead of filler material 74 there is filler material 174. For instance, the filler material 174 is a 3-D woven fabric that is shaped to a desired geometry and thickness to fill the space between the single leg 66c and the face skin fiber layers 72a/72b. Some types of airfoils, such as turbine vanes, are relatively small and a 3-D woven fabric may not be feasibly manufactured to such a small size. Therefore, the filler fiber material 174 may be better suited to relatively larger airfoils. In one alternative, the filler material 174 is a monolithic ceramic, such as SiC or $Al_2O_3$. In further examples, the filler material 174 may be a combination of full or partially densified CMC plies and monolithic structure.

Figure 7:
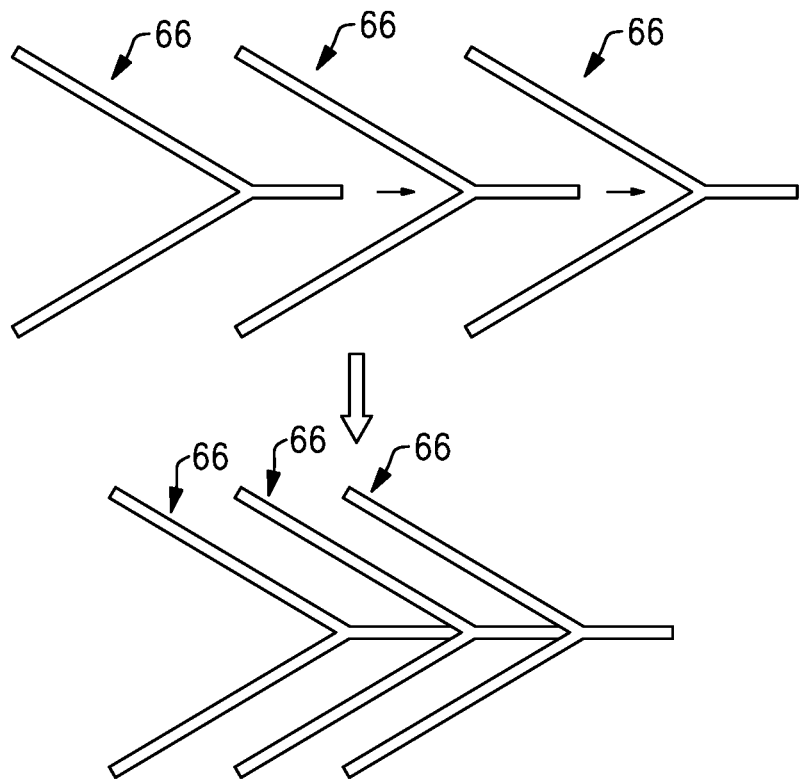
FIG. 7 illustrates nested wishbone-shaped fiber structures.
Figure 8:
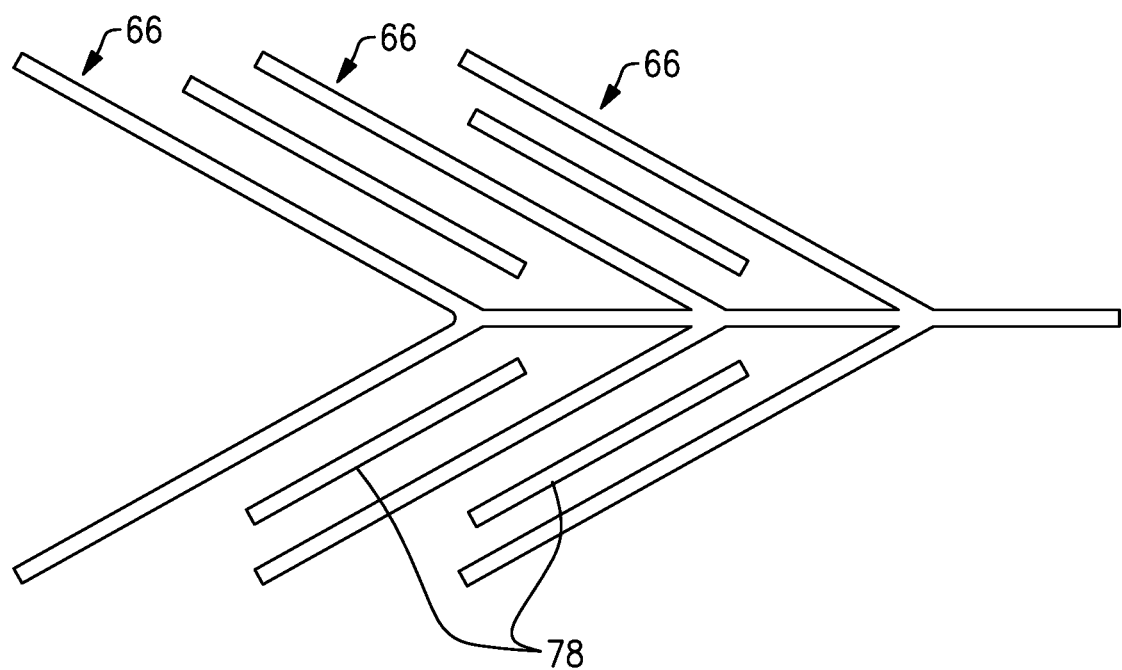
FIG. 8 illustrates nested wishbone-shaped fiber structures with fiber filler plies in between the fiber structures.

FIG. 7 illustrates another example that can be incorporated into the trailing end 62b of the airfoil 60. Here, rather than a single wishbone-shaped fiber layer structure 66 as in the prior examples, there is a series of structures 66 that are nested together to form a chevron pattern. For instance, each structure 66 nests into the "V" of the next structure 66 to in essence form a stack of structures 66. As further shown in FIG. 8, one or more filler fiber plies 78, which may be the same as the plies used above in the filler fiber material 74, can be provided between consecutive ones of the structures 66. The filler fiber plies 78 serve to strengthen the overall structure and also take up space in order to achieve the desired shape of the trailing end 62c. The filler fiber plies 78 may be 2D fiber layers or 3D fiber pieces. As shown, the filler fiber plies 78 are discrete pieces between each structure 66, however, the filler fiber plies 78 may alternatively be continuous V-shaped pieces that nest into the "V" of the structure 66.

Figure 9:
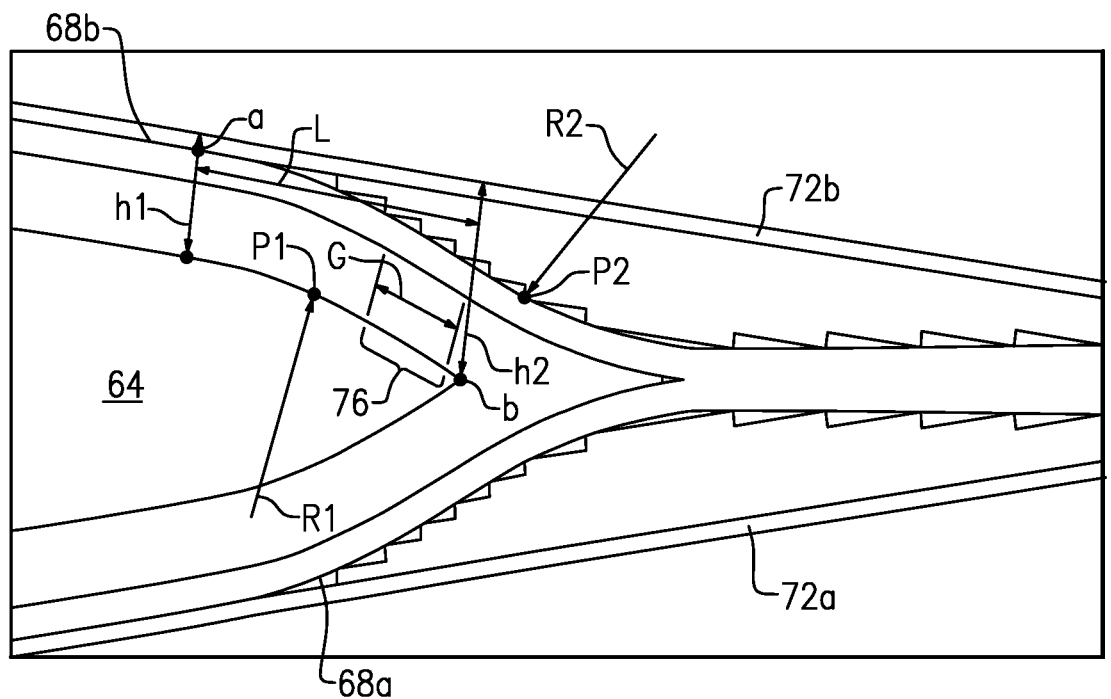
FIG. 9 illustrates another example trailing end of an airfoil.

FIG. 9 illustrates a further example that can be applied with any of the aforementioned examples. As depicted, the only the peripheral outlines of the various fiber layers are shown, although it is understood that the nominal structure is as shown in FIG. 3, or alternatively as shown in FIG. 6. In this example, there is a height "h1" defined as the distance taken perpendicularly from the surface of the face skin 72b to the inside surface of the fiber layer 68b and intersecting a point "a" at which the fiber layer 68b begins to bend into a convex curvature. There is a second height "h2" defined as the distance taken perpendicularly from the surface of the face skin 72b to the point "b" at which the fiber layers 68a/68b initially merge. There is a length "L" that is defined as the distance taken perpendicularly from the height h1 to the height h2. Each inflection point P1 and P2 also have associated radii of curvature R1 and R2, respectively. Optionally, if there a straight portion 76, it has a length "G." It is to be understood that the fiber layer 68a has the same above attributes as fiber layer 68b with respect to face skin 72a.

In the illustrated example, the various heights and lengths above are selected to evenly distribute bending stresses due to pressure in the cavity 64. For example:

$2h1 \leq L \leq 4h1;$ $5h1 \leq R1 \leq 8h1;$ $5h1 \leq R2 \leq 8h1;$ $1.1h1 \leq h2 \leq 3h1;$ and $0 \leq G \leq 2h1$ When the cavity 64 is pressurized, the pressure tends to spread the fiber layers 68a/68b apart, thereby applying a bending stress on the fiber layers 68a/68b. The attributes above serve to facilitate an even distribution of that stress along the lengths of fiber layers 68a/68b from the location at "a" to the location at "b." For instance, the attributes above facilitate the establishment of each fiber layer 68a/68b as a constant strength beam such that for a given bending moment applied at the location of h1, the stress along the respective fiber layers 68a/68b from "a" to "b" is substantially constant. Thus, the rather than the bending stress being concentrated at a location, which would cause a relatively high stress peak at that location, the stress is distributed and thus lowered below the peak stress. That is, the gradual, constant increase in height from h1 to h2 provided by the S-shaped geometry serves to facilitate distributed, relatively lower stress.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil wall defining a leading end, a trailing end, and pressure and suction sides that join the leading end and the trailing end, the airfoil wall including a wishbone-shaped fiber layer structure, the wishbone-shaped fiber layer structure including a pair of arms that merge into a single leg, the pair of arms being formed by first and second S-shaped fiber layers each of which is comprised of a network of fiber tows and each of which defines two inflection points, the first and second S-shaped fiber layers merging to form the single leg, wherein in the single leg at least one of the fiber tows from the first S-shaped fiber layer is interlaced with at least one of the fiber tows from the second S-shaped fiber layer, the single leg forming at least a portion of the trailing end of the airfoil wall.

2. The airfoil as recited in claim 1, wherein the wishbone-shaped fiber layer structure is situated between an exterior pressure side face skin fiber layer and an exterior suction side face skin fiber layer.

3. The airfoil as recited in claim 2, wherein there is filler material between the single leg of the wishbone-shaped fiber layer structure and the exterior pressure side face skin fiber layer and between the single leg and the exterior suction side face skin fiber layer.

4. The airfoil as recited in claim 3, wherein the filler material, the exterior pressure side face skin fiber layer, and the exterior suction side face skin fiber layer are of equivalent compositions.

5. The airfoil as recited in claim 4, wherein the first and second S-shaped fiber layers are also of the equivalent composition.

6. The airfoil as recited in claim 4, wherein the filler material is selected from a group consisting of a monolithic ceramic, 3-D woven fabric, fully or partially densified fiber material, and combinations thereof.

7. The airfoil as recited in claim 1, wherein the pair of arms define an airfoil cavity there between.

8. The airfoil as recited in claim 1, wherein the first and second S-shaped fiber layers are ceramic matrix composite.

9. The airfoil as recited in claim 1, wherein the first and second S-shaped fiber layers define, respectively, thicknesses $t1$ and $t2$, the single leg defines a thickness $t3$, and $t3$ is less than to the sum of $t1$ and $t2$.

10. The airfoil as recited in claim 1, wherein each of the first and second S-shaped fiber layers includes a region between the two inflection points over which the respective first or second S-shaped fiber layer is straight.

11. A gas turbine engine comprising:
a compressor section;
a combustor in fluid communication with the compressor section; and
a turbine section in fluid communication with the combustor, the turbine section having airfoils disposed about a central axis of the gas turbine engine, each of the airfoils includes:
an airfoil wall defining a leading end, a trailing end, and pressure and suction sides that join the leading end and the trailing end, the airfoil wall including a wishbone-shaped fiber layer structure, the wishbone-shaped fiber layer structure including a pair of arms that merge into a single leg, the pair of arms being formed by first and second S-shaped fiber layers each of which is comprised of a network of fiber tows and each of which defines two inflection points, the first and second S-shaped fiber layers merging to form the single leg, wherein in the single leg at least one of the fiber tows from the first S-shaped fiber layer is interlaced with at least one of the fiber tows from the second S-shaped fiber layer, the single leg forming at least a portion of the trailing end of the airfoil wall.

12. The gas turbine engine as recited in claim 11, wherein the wishbone-shaped fiber layer structure is situated between an exterior pressure side face skin fiber layer and an exterior suction side face skin fiber layer, there is filler fiber material between the single leg of the wishbone-shaped fiber layer structure and the exterior pressure side face skin fiber layer and between the single leg and the exterior suction side face skin fiber layer, and the pair of arms define an airfoil cavity there between.

13. The gas turbine engine as recited in claim 12, wherein the filler fiber material, the exterior pressure side face skin fiber layer, the exterior suction side face skin fiber layer, the first and second S-shaped fiber layers are of the equivalent ceramic matrix composite compositions, the first and second S-shaped fiber layers define, respectively, thicknesses $t1$ and $t2$, the single leg defines a thickness $t3$, and $t3$ is less than the sum of $t1$ and $t2$.

14. The airfoil as recited in claim 1, wherein the first and second S-shaped fiber layers define, respectively, thicknesses $t1$ and $t2$, the single leg defines a thickness $t3$, and $t3$ is less than or equal to the sum of $t1$ and $t2$.

* * * * *